United States Patent
Ko et al.

(10) Patent No.: US 10,980,041 B1
(45) Date of Patent: Apr. 13, 2021

(54) METHOD AND APPARATUS FOR SCHEDULING IN WIRELESS COMMUNICATION SYSTEM

(71) Applicants: Samsung Electronics Co., Ltd., Suwon-si (KR); KOREA ADVANCED INSTITUTE OF SCIENCE AND TECHNOLOGY, Daejeon (KR)

(72) Inventors: Jaeyun Ko, Suwon-si (KR); Song Chong, Daejeon (KR); Joseph Jeon, Seongnam-si (KR); Okyoung Choi, Daejeon (KR)

(73) Assignees: Samsung Electronics Co., Ltd., Suwon-si (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 205 days.

(21) Appl. No.: 16/464,578

(22) PCT Filed: Nov. 28, 2017

(86) PCT No.: PCT/KR2017/013635
§ 371 (c)(1),
(2) Date: May 28, 2019

(87) PCT Pub. No.: WO2018/097686
PCT Pub. Date: May 31, 2018

(30) Foreign Application Priority Data

Nov. 28, 2016  (KR) .................. 10-2016-0159145

(51) Int. Cl.
*H04W 72/12* (2009.01)
(52) U.S. Cl.
CPC ... *H04W 72/1231* (2013.01); *H04W 72/1252* (2013.01)

(58) Field of Classification Search
CPC .................. H04W 72/1231; H04W 72/1252
See application file for complete search history.

(56) References Cited

U.S. PATENT DOCUMENTS

| 2003/0198204 | A1* | 10/2003 | Taneja | .............. H04L 5/023 370/332 |
| 2005/0085235 | A1* | 4/2005 | Park | ................. H04W 72/06 455/450 |

(Continued)

FOREIGN PATENT DOCUMENTS

| KR | 10-2005-0090975 A | 9/2005 |
| KR | 10-0566210 B1 | 3/2006 |

(Continued)

OTHER PUBLICATIONS

Delay-Based Network Utility Maximization.
(Continued)

*Primary Examiner* — Afshawn M Towfighi
(74) *Attorney, Agent, or Firm* — Jefferson IP Law, LLP

(57) ABSTRACT

The present disclosure provides a method and an apparatus for scheduling traffic in a wireless communication system. A method for a base station operating in a wireless communication system according to an embodiment of the present disclosure comprises the steps of: receiving feedback information from a plurality of terminals; and scheduling the plurality of terminals based on the feedback information, wherein the step of scheduling the plurality of terminals includes a step of scheduling so as to reduce throughput of terminals in a first group of the plurality of terminals that are in an overload state, and to satisfy delay-based quality of service (QoS) of terminals in a second group of the plurality of terminals that are in under-load state. As a result, the total utility of all the terminals can be maximized, a delay-based QoS with respect to all the terminals can be achieved on (Continued)

average, and a minimum data rate-based QoS can be achieved on average.

16 Claims, 11 Drawing Sheets

(56) References Cited

U.S. PATENT DOCUMENTS

| | | |
|---|---|---|
| 2006/0212594 A1 | 9/2006 | Haner et al. |
| 2007/0218918 A1* | 9/2007 | Liu .................. H04W 72/1226 455/452.1 |
| 2009/0116439 A1 | 5/2009 | Madan et al. |
| 2010/0002648 A1 | 1/2010 | Rudolf et al. |
| 2014/0073342 A1 | 3/2014 | Lioulis et al. |
| 2015/0173084 A1 | 6/2015 | Chou et al. |
| 2016/0353464 A1 | 12/2016 | Kim et al. |
| 2016/0353469 A1 | 12/2016 | Kim et al. |

FOREIGN PATENT DOCUMENTS

| | | | |
|---|---|---|---|
| KR | 10-2016-0139822 A | 12/2016 | |
| KR | 10-2016-0140098 A | 12/2016 | |
| WO | 2005/034443 A1 | 4/2005 | |
| WO | 2016/186729 A1 | 11/2016 | |

OTHER PUBLICATIONS

Scheduling Algorithms for Multicarrier Wireless Data Systems.
European Search Report dated Nov. 8, 2019, issued in the European Application No. 17874987.5.

* cited by examiner

METHOD AND APPARATUS FOR SCHEDULING IN WIRELESS COMMUNICATION SYSTEM

CROSS-REFERENCE TO RELATED APPLICATION(S)

This application is a U.S. National Stage application under 35 U.S.C. § 371 of an International application number PCT/KR2017/013635, filed on Nov. 28, 2017, which is based on and claimed priority of a Korean patent application number 10-2016-0159145, filed on Nov. 28, 2016, in the Korean Intellectual Property Office, the disclosure of which is incorporated by reference herein in its entirety.

TECHNICAL FIELD

The present disclosure generally relates to a wireless communication system, and more specifically, relates to a method and an apparatus for scheduling traffic in the wireless communication system.

BACKGROUND ART

A scheduler in a current wireless communication system needs not only to service traffic to a user but also to service the traffic so as to achieve quality of service (QoS) requirements which are set variously for each traffic per provider and service. To forward the QoS requirements based on characteristics of the traffic to a base station, a QoS class identifier (QCI) indicator is used. The QCI is the indicator which defines purpose, performance, and requirements of the traffic, and if this indicator is forwarded to the base station, the base station may allocate resources to satisfy the QoS for each traffic using the QCI.

In recent, the traffic characteristics in which packets requiring various QoSs are mixed according to advances of a communication network and a smart device is emerging, and accordingly, a scheduler for achieving optimal performance by considering several QoSs at the same time is greatly needed.

DISCLOSURE OF INVENTION

Technical Problem

Various embodiments of the present disclosure provide a method and an apparatus for scheduling in a wireless communication system.

Various embodiments of the present disclosure provide a method and an apparatus for scheduling to satisfy various quality of service (QoS) requirements of a plurality of terminals for a single carrier.

Various embodiments of the present disclosure provide a method and an apparatus for scheduling to satisfy various quality of service (QoS) requirements of a plurality of terminals for multiple carriers.

Various embodiments of the present disclosure provide a method and an apparatus for scheduling to satisfy various quality of service (QoS) requirements of a plurality of terminals for multiple carriers by considering a cooperation type of a plurality of base stations.

Solution to Problem

To address the above-stated problem, an operating method of a base station according to an embodiment of the present disclosure includes receiving feedback information from a plurality of terminals, and scheduling the plurality of terminals based on the feedback information. In addition, scheduling the plurality of terminals includes scheduling to reduce throughput for first group of terminals in an overload state among the plurality of terminals, and to satisfy delay quality of service (QoS) for terminals of a second group in an under-load state among the plurality of terminals.

An apparatus of a base station according to an embodiment of the present disclosure comprises a communication unit for receiving feedback information from a plurality of terminals, and a scheduler for scheduling the plurality of terminals based on the feedback information. In addition, the scheduler schedules to reduce throughput for first group of terminals in an overload state among the plurality of terminals, and to satisfy delay QoS for terminals of a second group in an under-load state among the plurality of terminals.

Advantageous Effects of Invention

A method and an apparatus according to various embodiments of the present disclosure may maximize total utility of all terminals, achieve delay quality of service (QoS) for all the terminals on average, and achieve minimum data rate QoS on average, by scheduling to reduce throughput for first group of terminals having overload of a transmit packet among the plurality of terminals and to satisfy the delay QoS for terminals of a second group having under-load of a transmit packet among the plurality of terminals.

Effects obtainable from the present disclosure are not limited to the above-mentioned effects, and other effects which are not mentioned may be clearly understood by those skilled in the art of the present disclosure through the following descriptions.

BEST MODE FOR CARRYING OUT THE INVENTION

Terms used in the present disclosure are used for describing particular embodiments and are not intended to limit the scope of other embodiments. A singular form may include a plurality of forms unless it is explicitly differently represented. All the terms used herein, including technical and scientific terms, may have the same meanings as terms generally understood by those skilled in the art to which the present disclosure pertains. Among terms used in the present disclosure, the terms defined in a general dictionary may be interpreted to have the same or similar meanings with the context of the relevant art, and, unless explicitly defined in this disclosure, it shall not be interpreted ideally or excessively as formal meanings. In some cases, even terms defined in this disclosure should not be interpreted to exclude the embodiments of the present disclosure.

In various embodiments of the present disclosure to be described below, a hardware approach will be described as an example. However, since the various embodiments of the present disclosure include a technology using both hardware and software, the various embodiments of the present disclosure do not exclude a software-based approach.

Hereafter, the present disclosure relates to an apparatus and a method for scheduling traffic in a wireless communication system. Specifically, the present disclosure describes a technique for scheduling the traffic to maximize total utility of all terminals, to achieve delay quality of service (QoS) for all the terminals on average, and to achieve minimum data rate QoS on average in the wireless communication system.

Terms indicating control information, terms indicating network entities, terms indicating transmit and receive information, and terms indicating components of an apparatus, which are used in the following descriptions, are for the sake of explanations. Accordingly, the present disclosure is not limited to the terms to be described, and may use other terms having technically identical meaning.

The present disclosure describes various embodiments using terms used in some communication standards (e.g., long term evolution (LTE) system and LTE-advanced (LTE-A)), which is merely an example for the explanations. Various embodiments of the present disclosure may be easily modified and applied in other communication systems.

Figure 1:
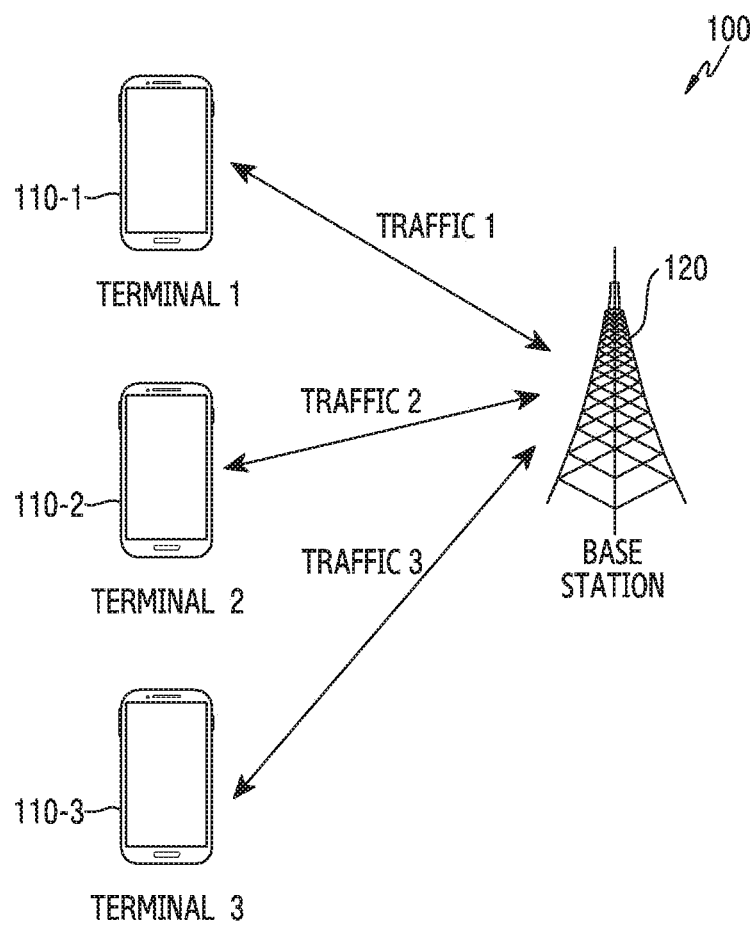
FIG. 1 illustrates a wireless communication environment according to various embodiments of the present disclosure.

FIG. 1 illustrates a wireless communication environment 100 according to various embodiments of the present disclosure.

The wireless communication environment 100 in FIG. 1 may include a plurality of terminals 110-1, 110-2, and 110-3 and a base station 120. However, the entities of the wireless communication environment 100 of FIG. 1 are exemplary, and at least one entity may be omitted in the wireless communication environment 100, or the wireless communication environment 100 may further include other entities. For example, the wireless communication environment 100 may include a plurality of terminals including the three terminals 110-1, 110-2, and 110-3. Also, the wireless communication environment 100 may further include at least one base station in addition to the base station 120, and the at least one base station may perform cooperative transmission and reception with the plurality of terminals 110-1, 110-2, and 110-3 in cooperation with the base station 120.

The plurality of terminals 110-1, 110-2, and 110-3 each may communicate with the base station 120. For example, the plurality of terminals 110-1, 110-2, and 110-3 may receive traffic from the base station 120 at a downlink transmission opportunity, and transmit traffic to the base station 120 at an uplink transmission opportunity. Hereafter, the term 'traffic' in the present disclosure may be interchangeably used with 'data' or 'packet'. Although not depicted, the plurality of terminals 110-1, 110-2, and 110-3 may receive control information required to transmit and receive the traffic in the uplink and/or the downlink from the base station 120. In addition, the plurality of terminals 110-1, 110-2, and 110-3 may measure a channel with the base station 120 using a reference signal (RS) received from the base station 120, and feed the measured channel information back to the base station 120. For example, the feedback information provided from the plurality of terminals 110-1, 110-2, and 110-3 to the base station 120 may include information regarding the channel measurement result conducted by each of the plurality of terminals 110-1, 110-2, and 110-3.

According to various embodiments, the plurality of terminals 110-1, 110-2, and 110-3 may be a portable electronic device, and may be one of a smart phone, a portable terminal, a mobile phone, a mobile pad, a media player, a tablet computer, a handheld computer or a personal digital assistant (PDA). In addition, the electronic device may be a device which combines two or more functions of the above-stated devices.

The base station 120 is a network infrastructure which provides radio access to the plurality of terminals 110-1, 110-2, and 110-3. The base station 120 has coverage defined as a specific geographical area based on a signal transmission distance. The base station 120 may be referred to as an access point (AP), an eNodeB (eNB), a 5th generation node (5G node), a wireless point, a transmission/reception point (TRP), and so on.

The base station 120 may communicate with the plurality of terminals 110-1, 110-2, and 110-3. For example, the base station 120 may transmit first traffic, second traffic, and third traffic at the downlink transmission opportunity with respect to the plurality of terminals 110-1, 110-2, and 110-3 as shown in FIG. 1, and schedule resources for transmitting the traffics. In so doing, the base station 120 may perform the scheduling based on QoS class identifier (QCI) information corresponding to traffic characteristics of each of the plurality of terminals 110-1, 110-2, and 110-3. The QCI may include information regarding QoS required for the respective traffics. For example, the QCI information may include at least one of a QoS parameter relating to throughput fairness required for the respective traffics, a QoS parameter relating to maximum delay allowance, and a QoS parameter relating to a minimum data rate. Using the QCI information in scheduling the plurality of terminals 110-1, 110-2, and 110-3, the base station 120 may schedule the terminals 110-1, 110-2, and 110-3 to achieve the QoS requirements required by the first traffic, the second traffic, and the third traffic respectively.

According to various embodiments, the plurality of terminals 110-1, 110-2, and 110-3 may communicate with the base station using a single carrier or multiple carriers. If communicating with the plurality of terminals 110-1, 110-2, and 110-3 using the multiple carriers, the base station 120 may schedule the plurality of terminals 110-1, 110-2, and 110-3 for each of the multiple carriers. In addition, the base station 120 may communicate with the plurality of terminals 110-1, 110-2, and 110-3 in cooperation with at least one other base station, and in this case, the base station 120 may schedule the plurality of terminals 110-1, 110-2, and 110-3 by considering a cooperation type of the base station for each of the multiple carriers.

According to various embodiments of the present disclosure, the base station 120 may schedule each of the plurality of terminals 110-1, 110-2, and 110-3. In so doing, the base station 120 performs the scheduling by considering an 'overload state' and an 'under-load state'. Meanings of the overload and the under-load are defined as follows.

The 'overload' indicates a case where a traffic amount to transmit from the base station to a particular terminal is far greater than a traffic amount to transmit to other terminal. For example, if the traffic amount to transmit to the particular terminal is greater than a threshold traffic amount allowed to the particular terminal, the overload may be determined. In addition, if a ratio of packets for the particular terminal among packets in a buffer of the base station is higher than a threshold ratio, the overload may be determined.

The 'under-load' indicates a case where a traffic amount to transmit from the base station to a particular terminal is far less than a traffic amount to transmit to other terminal. For example, if the traffic amount to transmit to the particular terminal is less than a threshold traffic amount allowed to the particular terminal, the under-load may be determined. In addition, if a ratio of packets for the particular terminal among packets in the buffer of the base station is less than a threshold ratio, the under-load may be determined. In the present disclosure, the under-load may indicate a state which is not the overload.

Figure 2:
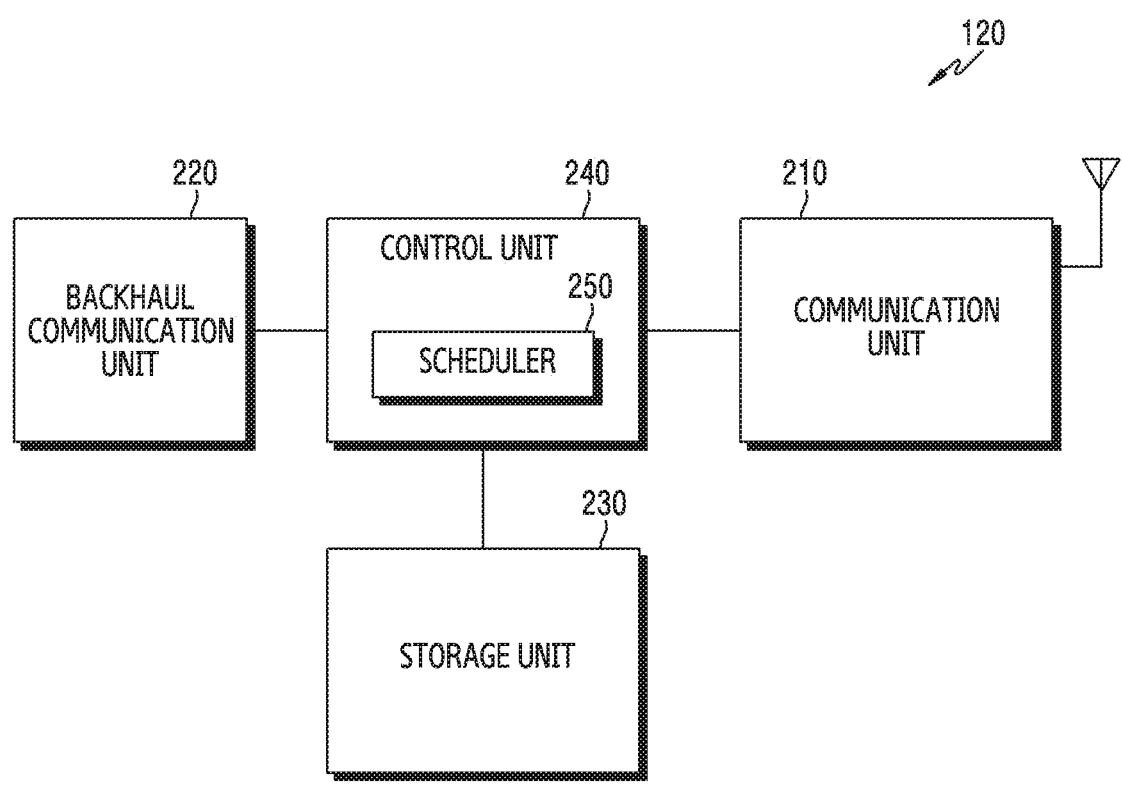
FIG. 2 illustrates a block configuration of a base station in a wireless communication system according to various embodiments of the present disclosure.

FIG. 2 illustrates a block configuration of a base station in a wireless communication system according to various embodiments of the present disclosure. A term such as 'portion' or '~ er' used hereafter indicates a unit for processing at least one function or operation, and may be implemented using hardware, software, or a combination of hardware and software.

Referring to FIG. 2, the base station 120 according to various embodiments of the present disclosure may include a wireless communication unit 210, a backhaul communication unit 220, a storage unit 230, and a control unit 240. While FIG. 2 depicts that the base station 120 includes the wireless communication unit 210, the backhaul communication unit 220, the storage unit 230, and the control unit 240, this is exemplary, the base station 120 may further include other component, and some of the wireless communication unit 210, the backhaul communication unit 220, the storage unit 230, and the control unit 240 may be omitted.

The wireless communication unit 210 may perform functions for transmitting and receiving signals over a radio channel. For example, the wireless communication unit 210 performs a conversion function between a baseband signal and a bit string according to a physical layer standard of the system. For example, in data transmission, the wireless communication unit 210 generates complex symbols by encoding and modulating a transmit bit string. Also, in data reception, the wireless communication unit 210 restores a receive bit string by demodulating and decoding a baseband signal. Also, the wireless communication unit 210 up-converts the baseband signal to a radio frequency (RF) band signal, transmits it via an antenna, and down-converts an RF band signal received via an antenna to a baseband signal. According to various embodiments, the wireless communication unit 210 may receive feedback information from a plurality of terminals.

For doing so, the wireless communication unit 210 may include a transmit filter, a receive filter, an amplifier, a mixer, an oscillator, a digital to analog convertor (DAC), an analog to digital convertor (ADC), and so on. In addition, the wireless communication unit 210 may include a plurality of transmit and receive paths. Further, the wireless communication unit 210 may include at least one antenna array including a plurality of antenna elements. In terms of the hardware, the wireless communication unit 210 may include a digital unit and an analog unit, and the analog unit may include a plurality of sub-units according to an operating power and an operating frequency.

The wireless communication unit 210 transmits and receives the signals as stated above. Hence, the wireless communication unit 210 may be referred to as a transmitter, a receiver, or a transceiver. Also, in the following, the transmission and the reception performed over the radio channel are used as the meaning which embraces the above-stated processing of the wireless communication unit 210.

The backhaul communication unit 220 provides an interface for communicating with other nodes in the network. That is, the backhaul communication unit 220 converts a bit sting transmitted from the base station 120 to another node, for example, to another access node, another base station, an upper node, or a core network, to a physical signal, and converts a physical signal received from the other node to a bit string. According to various embodiments, the backhaul communication unit 220 may receive information relating to a channel state from at least one neighboring base station.

The storage unit 230 is coupled to the control unit 240. The storage unit 230 stores a basic program for operating the base station 120, an application program, and data such as setting information. The storage unit 230 may include a volatile memory, a non-volatile memory, or a combination of a volatile memory and a non-volatile memory. Specifically, part of the storage unit 230 may include a random access memory (RAM), and another part of the storage unit 230 may include a flash memory or other read-only memory (ROM). The storage unit 230 provides the stored data at a request of the control unit 240. According to various embodiments, the storage unit 230 may store the QCI information. In addition, the storage unit 230 may store a system state variable, a channel state variable, QoS state variables calculated for the scheduling, and variable values and parameter values required for the scheduling. At least part of the storage unit 230 may include a buffer, and store traffic to be transmitted to the plurality of terminals.

The control unit 240 may control the wireless communication unit 210 and the storage unit 230 functionally coupled with the control unit 240. For example, the control unit 240 may control reception of a downlink channel signal and transmission of an uplink channel signal using the wireless communication unit 210. In some embodiments, the control unit 240 may include at least one microprocessor or microcontroller. The control unit 240 may execute other processor or program which is present in the storage unit 230. The control unit 240 may move or fetch data to or from the storage unit 230 as requested by an execution process. In some embodiments, the control unit 240 is configured to execute an application in response to a received signal based on an operating system (OS).

According to various embodiments, the control unit 240 may include a scheduler 250. The control unit 240 may control an operation of the scheduler 250, and accordingly the operation performed by the scheduler 250 to be explained may be understood as the operation performed by the control unit 240.

The base station 120 needs to transmit all traffics required by the plurality of terminals 110-1, 110-2, and 110-3 respectively. However, according to a limited channel capacity, a maximum amount of the traffic provided by the base station 120 to the plurality of terminals during a unit time is limited. At a specific time, if the amount of the traffic to be provided by the base station 120 to the terminals exceeds an amount processed by the base station 120, the base station 120 may transmit only some traffic by appropriately scheduling the traffic transmission for the respective terminals, and store traffic not transmitted in the buffer of the base station 120 so as to transmit it at a next transmission opportunity. The scheduler 250 may perform the scheduling on the traffic to transmit by the base station 120 as stated above.

In conducting the scheduling, the scheduler 250 needs to consider QoS required by the traffic for each of the terminals 110-1, 110-2, and 110-3. A type and a level of the QoS required by each traffic may vary per application executed at each of the terminals 110-1, 110-2, and 110-3. For example, if an application executed at the terminal 110-1 is an application requiring a relatively low speed/low capacity service such as call, short message service (SMS), the level of the QoS required by the first traffic transmitted to the terminal 110-1 may be low. By contrast, if an application executed at the terminal 110-2 is an application requiring a relatively high speed/high capacity service such as high quality streaming service, the level of the QoS required by the second traffic transmitted to the terminal 110-2 may be high. As such, the type and the level of the QoS required by each traffic are different, and the scheduler 250 needs to identify the QoS required by each traffic based on the QCI information and then schedule each terminal to satisfy various QoS requirements.

The scheduling process performed by the scheduler 250 may be divided into two steps as follows.

(first step) Determine a scheduling metric.

(second step) Schedule a terminal having the maximum scheduling metric determined.

In the first step, the scheduler 250 determines the scheduling metric for each of the plurality of terminals. The scheduling metric is a criterion value of priority for the scheduler 250 to schedule each of the terminals, and corresponds to a value calculated for each of the terminals. For example, to calculate the scheduling metric, the scheduler 250 may consider the feedback information received from each of the terminals, the buffer state of the base station 120, and the QoS required by each of the terminals. According to various embodiments, the scheduler 250 may calculate the scheduling metric by considering only the QoS belonging to a specific type among the QoSs required by each of the terminals. For example, the scheduler 250 may calculate the scheduling metric for the plurality of terminals by considering only the QoS relating to the throughput fairness among the QoSs of various types required by each of the plurality of terminals. Alternatively, the scheduler 250 may calculate the scheduling metric for the plurality of terminals by considering only the QoS relating to the throughput fairness and the maximum delay allowance among the QoSs of various types required by each of the terminals.

In the second step, the scheduler 250 determines the maximum value of the scheduling metric values calculated in the first step, and determines a terminal corresponding to the maximum value. Next, the scheduler 250 schedules the terminal of the maximum scheduling metric value first of all. By reflecting the scheduling result for a specific terminal, the scheduler 250 may schedule other terminal by re-performing the first step and the second step.

As stated above, the scheduling result may differ depending on the method of the scheduler 250 for determining the scheduling metric. The scheduler 250 needs to efficiently schedule the traffic to be transmitted to each terminal by considering the QoS requirements required by each of the terminals, and the following describes a configuration and an operating method of the scheduler 250 for the efficient scheduling with various embodiments of the present disclosure.

Figure 3:
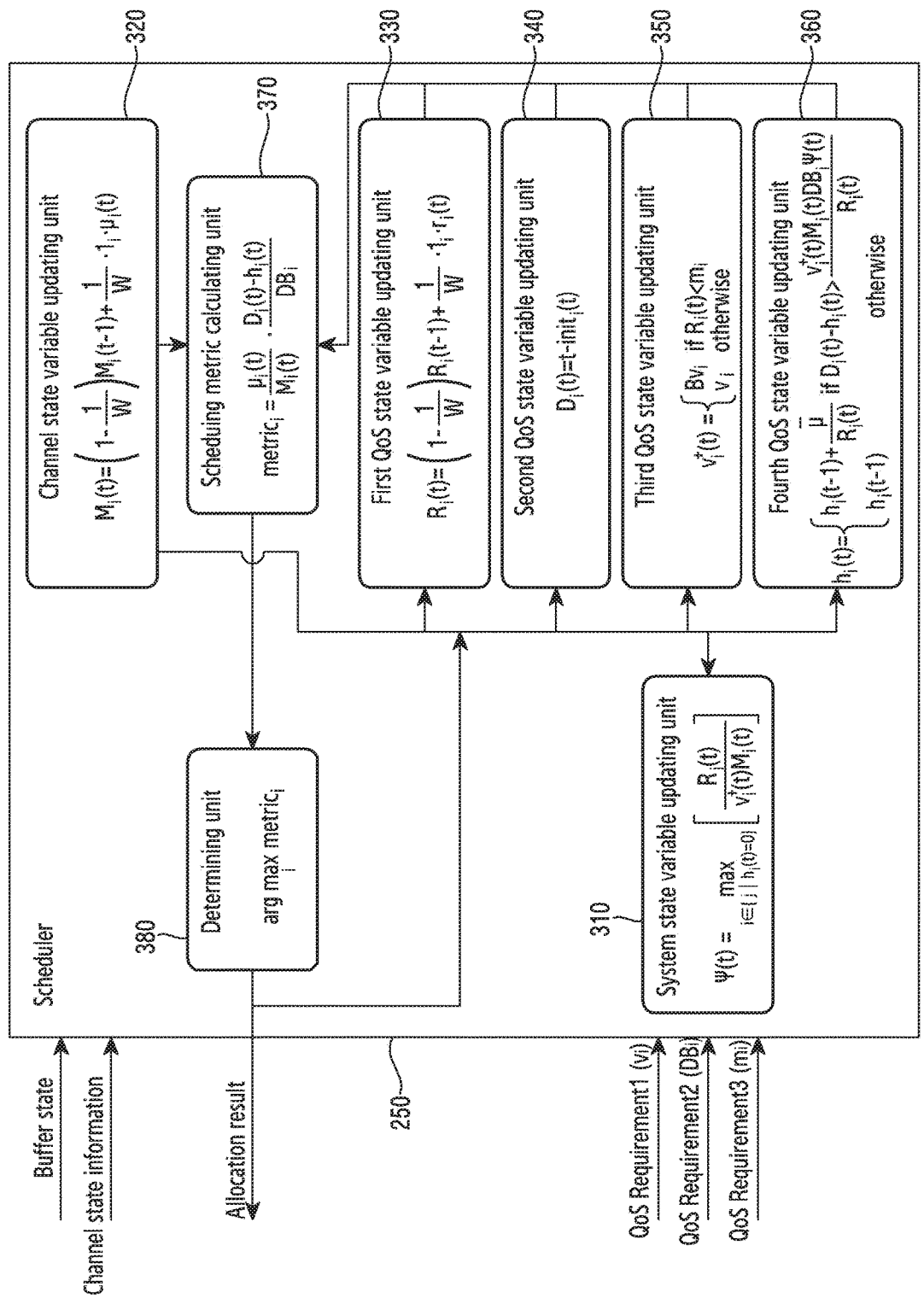
FIG. 3 illustrates a block configuration of a scheduler in a wireless communication system according to various embodiments of the present disclosure.

FIG. 3 illustrates a block configuration of a scheduler in a wireless communication system according to various embodiments of the present disclosure. A term such as 'portion' or '~ er' used hereafter indicates a unit for processing at least one function or operation, and may be implemented using hardware, software, or a combination of hardware and software.

Referring to FIG. 3, the scheduler 250 includes a system state variable updating unit 310, a channel state variable updating unit 320, a first QoS state variable updating unit 330, a second QoS state variable updating unit 340, a third QoS state variable updating unit 350, a fourth QoS state variable updating unit 360, a scheduling metric calculating unit 370, and a determining unit 380. The function blocks included in the scheduler 250 are merely logical function blocks divided for the sake of explanations, and may not indicate physical hardware. In addition, the function blocks included in the scheduler 250 may be combined or omitted, and a calculation performed by the omitted function block may be conducted directly by the scheduler 250.

In the following explanations, it is assumed that a plurality of terminals communicate with the base station 120 using a single carrier. However, the plurality of terminals may communicate with the base station 120 using multiple carriers, and the base station 120 may communicate with the plurality of terminals in cooperation with at least one other base station. Embodiments relating to the multiple carriers and the cooperative transmission are described in detail in FIGS. 6A, 6B, 7, 8A, 8B, and 9.

The scheduler 250 may determine parameters for the scheduling. For example, the scheduler 250 may obtain channel state information for each terminal by receiving feedback information from the plurality of terminals, and identify a buffer state of the base station 120. In addition, the scheduler 250 may identify QoS requirements for each terminal using QCI information. According to various embodiments of the present disclosure, the QCI information may include at least one of a QoS parameter (hereafter, '$v_i$') relating to the throughput fairness for each terminal, a QoS parameter (hereafter, '$DB_i$') relating to the maximum delay allowance, and a QoS parameter (hereafter, '$m_i$') relating to the minimum data rate. The QoS requirements relating to the parameters and the parameters are defined as shown in Table 1.

TABLE 1

| QoS requirements | Related parameter | Definition of parameter |
|---|---|---|
| Throughput fairness | $v_i$ | Weight for terminal ($v_i = 1$: default value/if $v_i = n$, n time of weight is given to terminal$_i$ |
| Maximum delay allowance | $DB_i$ | Delay upper bound allowed to terminal$_i$ (ms) |
| Minimum data rate | $m_i$ | Minimum data rate of terminal$_i$ |

The parameter $v_i$ is a throughput weight for a terminal$_i$, and a default value for $v_i$ is set to 1. If the throughput fairness QoS level required by the terminal$_i$ is high, $v_i$ is set to n and the weight of n times may be given to the throughput for the terminal$_i$. The parameter $DB_i$ indicates a maximum delay upper bound allowed to the terminal$_i$ which uses is a service sensitive to the delay. In other words, $DB_i$ indicates that the terminal$_i$ requires the QoS to delay the traffic below $DB_i$. For the terminal$_i$ which uses is a service not sensitive to the delay, the value of $DB_i$ may be set to a quite great value. In the present disclosure, $DB_i$ indicating the maximum delay allowance QoS may be referred to as a 'delay QoS requirement'. The parameter $m_i$ is the minimum data rate, and indicates that the terminal$_i$ requires the QoS to maintain the data rate over a specific level corresponding to the value $m_i$. For the terminal$_i$ which does not specifically require the minimum data rate, the value $m_i$ may be set to zero. According to a combination of the above-stated parameters $v_i$, $DB_i$, and $m_i$ values, the QoS requirements for the terminal$_i$ may be expressed.

To achieve the QoS requirements expressed with the above-stated parameters $v_i$, $DB_i$, and $m_i$, the scheduler 250 may determine a system state variable, a channel state variable, and QoS state variables. Specifically, the scheduler 250 may determine the system state variable, the channel state variable, and the QoS state variables as shown in Table 2.

TABLE 2

| State variable | Definition | Purpose |
|---|---|---|
| $\Psi(t)$ | Maximum value of ratio of average throughput to data rate considering weight for terminal | To adjust trade-off between throughput fairness and delay upper bound QoS |
| $M_i(t)$ | Achievable rate of terminal$_i$ | To guarantee delay QoS |
| $R_i(t)$ | Average throughput allocated to terminal$_i$ | To guarantee throughput fairness |
| $D_i(t)$ | Head-of-line delay for terminal$_i$ | To guarantee delay QoS |
| $v_i^+(t)$ | Weight for terminal$_i$ associated with minimum data rate achievement of terminal$_i$ | To guarantee throughput fairness and minimum data rate QoS |
| $h_i(t)$ | Delay related control factor of terminal$_i$ | To guarantee throughput fairness and minimum data rate QoS |

In the above table, $\Psi(t)$ denotes the system state variable, $M_i(t)$ denotes the channel state variable, and $R_i(t)$, $D_i(t)$, $v_i^+(t)$, and $h_i(t)$ denote first QoS, second QoS, third QoS, and fourth QoS state variables respectively.

The system state variable updating unit 310 determines the system state variable. For doing so, the system state variable updating unit 310 considers the data rate and the throughput of at least one terminal having a vacant buffer. For example, the system state variable T (t) may be determine to a maximum value of an average throughput to the data rate in consideration of the weight for the terminal, with respect to at least one terminal having a transmission queue which is zero. Specifically, the system state variable updating unit 310 may determine the system state variable $\Psi(t)$ based on the following Equation 1.

$$\psi(t) = \max_{i \in \{j|h_j(t)=0\}} \left[ \frac{R_i(t)}{v_i^+(t)M_i(t)} \right] \quad \text{Equation 1}$$

Herein, $\Psi(t)$ denotes the maximum value of the average throughput to the data rate in consideration of the weight for the terminal, $R_i(t)$ denotes an average throughput allocated to the terminal$_i$, $v_i^+(t)$ denotes a weight for the terminal$_i$ relating to minimum data rate achievement of the terminal$_i$, $M_i(t)$ denotes an average achievable data rate of the terminal$_i$, and $h_i(t)$ denotes a delay related control factor of the terminal$_i$. Herein, an initial value of $h_i(t)$ for the terminal$_i$ is zero, which indicates that the transmission queue for the terminal$_i$ is zero. In other words, $h_i(t)=0$ indicates that no packets for the terminal terminal$_i$ remain in the buffer of the base station 120. Referring to Equation 1, the system state variable $\Psi(t)$ indicates the maximum value of at least one $$\frac{R_i(t)}{v_i^+(t)M_i(t)}$$

value calculated for at least one terminal$_i$ which satisfies $h_i(t)=0$.

The channel state variable updating unit 320 determines the average achievable data rate of each terminal. For doing so, the channel state variable updating unit 320 may cumulatively average a past average achievable data rate and a current achievable data rate. Specifically, the channel state variable updating unit 320 may determine the channel state variable $M_i(t)$ based on the following Equation 2.

$$M_i(t) = \left(1 - \frac{1}{W}\right)M_i(t-1) + \frac{1}{W} \cdot 1_i \cdot \mu_i(t) \quad \text{Equation 2}$$

Herein, $M_i(t)$ denotes the average achievable data rate of the terminal$_i$, W denotes a window size, $1_i$ denotes a parameter indicating whether the terminal$_i$ is scheduled or not, and $\mu_i(t)$ is the current achievable data rate of the terminal$_i$ and indicates an amount or efficiency of data transmittable at time t. The window size W is a value determined by the base station, and may indicate a time range considered to determine the average achievable data rate $M_i(t)$. The current achievable data rate $\mu_i(t)$ may be obtained from channel feedback information of the terminal$_i$. The parameter $1_i$ is a value which changes according to the scheduling result of the scheduler 250, $1_i=1$ if the terminal$_i$ is scheduled, and $1_i=0$ if the terminal$_i$ is not scheduled. In other words, the scheduling result for the terminal$_i$ may be reflected in calculating the average achievable data rate value of the current terminal$_i$ according to the parameter $1_i$ value.

The first QoS state variable updating unit 330 determines an average throughput of each terminal. For doing so, the first QoS state variable updating unit 330 may cumulatively average a past average throughput and a current throughput. Specifically, the first QoS state variable updating unit 330 may determine a first QoS state variable $R_i(t)$, based on the following Equation 3.

$$R_i(t) = \left(1 - \frac{1}{W}\right)R_i(t-1) + \frac{1}{W} \cdot 1_i \cdot r_i(t) \qquad \text{Equation 3}$$

Herein, $R_i(t)$ denotes the average throughput allocated to the terminal$_i$, W denotes the window size, $1_i$ denotes the parameter indicating whether the terminal$_i$ is scheduled or not, and $r_i(t)$ denotes the current throughput. The window size W is the value determined by the base station, and may indicate the time range considered to determine the average throughput $R_i(t)$. The throughput $r_i(t)$ may be determined based on a traffic amount actually scheduled for the terminal$_i$. The parameter $1_i$ is the value which changes according to the scheduling result of the scheduler 250, $1_i=1$ if the terminal$_i$ is scheduled, and $1_i=0$ if the terminal$_i$ is not scheduled. In other words, the scheduling result for the terminal$_i$ may be reflected in calculating the average throughput of the current terminal$_i$ according to the parameter $1_i$ value.

The second QoS state variable updating unit 340 determines a packet delay value for each terminal. For doing so, the second QoS state variable updating unit 340 may considers a time for which a packet to be transmitted to each terminal stays in the buffer. Specifically, the second QoS state variable updating unit 340 may determine a second QoS state variable $D_i(t)$, based on the following Equation 4.

$$D_i(t) = t - \text{init}_i(t) \qquad \text{Equation 4}$$

Herein, $D_i(t)$ denotes the delay value of the transmit packet for the terminal$_i$, t denotes a current time, and $\text{init}_i(t)$ denotes a time at which the oldest packet of the packets for the terminal$_i$ in the buffer of the base station 120 is initially inputted to the buffer at the current time t. In other words, $D_i(t)$ is head-of-line delay, and denotes a time elapsed from the initial input of the oldest packet of the packets for the terminal$_i$ in the buffer of the base station 120 into the buffer to the current time t.

The third QoS state variable updating unit 350 determines a weight in consideration of the minimum data rate for each terminal. For doing so, the third QoS state variable updating unit 350 may adjust the weight value according to the comparison result of the average throughput and the minimum data rate. Specifically, the third QoS state variable updating unit 350 may determine the third QoS state variable $v_i^+(t)$, based on the following Equation 5.

$$v_i^+(t) = \begin{cases} Bv_i & \text{if } R_i(t) < m_i \\ v_i & \text{otherwise} \end{cases} \qquad \text{Equation 5}$$

Herein, $v_i^+(t)$ denotes the weight for the terminal$_i$ relating to the minimum data rate achievement of the terminal$_i$, B denotes a constant of a great value, $v_i$ denotes the throughput weight for the terminal$_i$, $R_i(t)$ denotes the average throughput allocated to the terminal$_i$, and $m_i$ denotes the minimum data rate required at the terminal$_i$. The constant B may be set to the maximum traffic amount which may be processed by the base station 120 in a unit time.

Referring to Equation 5, if the average throughput $R_i(t)$ for the terminal$_i$ falls below the minimum data rate $m_i$ for the terminal$_i$ (i.e., the if condition is satisfied in Equation 5), the scheduler 250 may increase the weight for the terminal$_i$ to achieve the minimum data rate, by updating the value $v_i^+(t)$ with $Bv_i$. By contrast, if the average throughput $R_i(t)$ for the terminal$_i$ exceeds the minimum data rate $m_i$ for the terminal$_i$, the scheduler 250 determines that the terminal$_i$ satisfies the minimum data rate QoS, and maintains the value $v_i^+(t)$ with $v_i$.

The fourth QoS state variable updating unit 360 determines a delay related control factor reflected on the scheduling metric of each terminal. In so doing, the control factor may be updated or maintained according to the overload state or the under-load state. If the control factor is updated, the fourth QoS state variable updating unit 360 may increase the value of the control factor by the value determined based on the average throughput. Specifically, the fourth QoS state variable updating unit 360 may determine the fourth QoS state variable $h_i(t)$, based on the following Equation 6.

$$h_i(t) = \begin{cases} h_i(t-1) + \dfrac{\bar{\mu}}{R_i(t)} & \text{if } D_i(t) - h_i(t) > \dfrac{v_i^+(t)M_i(t)DB_{i\psi(t)}}{R_i(t)} \\ h_i(t-1) & \text{otherwise} \end{cases} \qquad \text{Equation 6}$$

Herein, $h_i(t)$ denotes the delay related control factor of the terminal$_i$, denotes the constant of the great value, $R_i(t)$ denotes the average throughput allocated to the terminal$_i$, $D_i(t)$ denotes the transmit packet delay value for the terminal$_i$, $v_i^+(t)$ denotes the weight for the terminal$_i$ relating to the minimum data rate achievement of the terminal$_i$, $M_i(t)$ denotes the average achievable data rate of the terminal$_i$, $DB_i$ denotes the delay upper bound allowed to the terminal$_i$, and $\psi(t)$ denotes the maximum value of the average throughput to the data rate in consideration of the weight for the terminal. The constant may be set to the maximum traffic amount processed by the base station 120 in the unit time. If the if condition is satisfied in Equation 6, the value $h_i(t)$ may be updated. Specifically, if the if condition is satisfied in Equation 6, the value $h_i(t)$ at the current time t may be updated to increase by $\bar{\mu}/R_i(t)$ from the $h_i(t-1)$ of a previous time t−1. The updating of the value $h_i(t)$ for the terminal$_i$ may continue until the if condition of Equation 6 is not established.

For example, the if condition in Equation 6 may be satisfied if the terminal$_i$ is in the overload state. In other words, if the terminal$_i$ is in the overload state, the delay related control factor $h_i(t)$ of the terminal$_i$ may be updated to increase. If the value $h_i(t)$ increases, the scheduling priority for the terminal$_i$ decreases, which is described in more detail.

The scheduling metric calculating unit 370 determines the scheduling metric of each terminal. For doing so, the scheduling metric calculating unit 370 may use the above-stated various variables. Specifically, the scheduling metric calculating unit 370 may determine the scheduling metric metric$_i$, based on the following Equation $$\text{metric}_i = \frac{\mu_i(t)}{M_i(t)} \cdot \frac{D_i(t) - h_i(t)}{DB_i} \qquad \text{Equation 7}$$

Herein, $\text{metric}_i$ denotes the scheduling metric for the $\text{terminal}_i$, $\mu_i(t)$ denotes the current data rate of the $\text{terminal}_i$, $M_i(t)$ denotes the average achievable data rate of the $\text{terminal}_i$, $D_i(t)$ denotes the transmit packet delay value for the $\text{terminal}_i$, $DB_i$ denotes the delay upper bound allowed to the $\text{terminal}_i$, and $h_i(t)$ denotes the delay related control factor of the $\text{terminal}_i$.

The determining unit 380 finally determines a terminal for the scheduling, and determines the $\text{terminal}_i$ of the greatest scheduling metric value $\text{metric}_i$ calculated for the plurality of terminals as the terminal for the scheduling. In other words, the determining unit 380 determines the $\text{terminal}_i$ having an index arg max $\text{metric}_i$ as the terminal for the scheduling.

According to Equation 7, the scheduler 250 schedules the user having the high current achievable data rate $\mu_i(t)$ to the average achievable data rate $M_i(t)$, the high transmit packet delay value $D_i(t)$ to the delay QoS requirement $DB_i$, and low delay related control factor $h_i(t)$. In other words, the scheduler 250 may achieve the delay QoS requirement of as many users as possible, by scheduling in comprehensive consideration of opportunistic gain $\mu_i(t)/M_i(t)$ of the channel and the current delay $D_i(t)-h_i(t)$ to the maximum delay allowance $DB_i$. Also, according to Equation 7, since the scheduling metric value $\text{metric}_i$ decreases as the delay related control factor $h_i(t)$ increases, the scheduling priority of the $\text{terminal}_i$ is lowered as the delay related control factor $h_i(t)$ for the $\text{terminal}_i$ increases.

To determining the scheduling terminal, the scheduler 250 determines at the fourth QoS state variable updating unit 360 whether the conditional equation $$D_i(t) - h_i(t) > \frac{v_i^+(t)M_i(t)DB_i\psi(t)}{R_i(t)}$$

of Equation 6 is satisfied with respect to all terminals to be scheduled. If there is at least one terminal which satisfies the conditional equation of Equation 6 with respect to all the terminals to be scheduled, the scheduler 250 may determine that the delay QoS requirements of all the terminals to be scheduled may not be achieved. In other words, if there is at least one terminal which is in the overload state in the system, the scheduler 250 may determine that the delay QoS requirements of all the terminals to be scheduled may not be achieved. The fourth QoS state variable updating unit 360 updates the delay related control factor $h_i(t)$, with respect to at least one terminal which satisfies the conditional equation $$D_i(t) - h_i(t) > \frac{v_i^+(t)M_i(t)DB_i\psi(t)}{R_i(t)}$$

of Equation 6.

The scheduler 250 may determine at the third QoS state variable updating unit 350 whether there is a terminal not satisfying the minimum data rate. In other words, the scheduler 250 may determine whether is the terminal not satisfying the minimum data rate by comparing the average throughput $R_i(t)$ for the $\text{terminal}_i$ with the minimum data rate $m_i$ for the $\text{terminal}_i$. If the average throughput $R_i(t)$ falls below the minimum data rate $m_i$ for the $\text{terminal}_i$ (i.e., the if condition of Equation 5 is satisfied), the scheduler 250 may increase the weight for the $\text{terminal}_i$ to achieve the minimum data rate, by updating the value $v_i^+(t)$ with $Bv_i$. If the value $v_i^+(t)$ is set high, the lower bound value $$\frac{v_i^+(t)M_i(t)DB_i\psi(t)}{R_i(t)}$$

in the conditional equation $$D_i(t) - h_i(t) > \frac{v_i^+(t)M_i(t)DB_i\psi(t)}{R_i(t)}$$

for determining whether to update the delay related control factor $h_i(t)$ for the $\text{terminal}_i$ at the fourth QoS state variable updating unit 360 increases, and accordingly it may be difficult to satisfy the $h_i(t)$ updating condition. In other words, the scheduler 250 may set the third QoS state variable $v_i^+(t)$ to the great value for the terminal if there is the terminal not satisfying the minimum data rate, and thus prevent the scheduling priority decrease of the corresponding terminal according to the fourth QoS state variable updating.

The scheduler 250 may lower the scheduling priority by updating the value $h_i(t)$ for the terminal satisfying the conditional equation $$D_i(t) - h_i(t) > \frac{v_i^+(t)M_i(t)DB_i\psi(t)}{R_i(t)}$$

at the fourth QoS state variable updating unit 360. In other words, the scheduler 250 may schedule to decrease the throughput against the previous scheduling by decreasing the scheduling priority for the terminal of the overload state. Thus, the scheduler 250 may schedule to satisfy the delay QoS for other terminals (the terminal not satisfying the conditional equation $$D_i(t) - h_i(t) > \frac{v_i^+(t)M_i(t)DB_i\psi(t)}{R_i(t)})$$

which are not in the overload state. If two or more terminals are in the overload state, the scheduler 250 may schedule to maximize total utility of the whole terminals, to achieve the delay QoS for the whole terminals on average, and to achieve the minimum data rate QoS on average, according to the above-stated scheduling method of the scheduler 250.

If two or more terminals are in the overload state, since the conditional equation $$D_i(t) - h_i(t) > \frac{v_i^+(t)M_i(t)DB_i\psi(t)}{R_i(t)}$$

is established between the system state variable, the QoS state variable, and the channel state variable for each terminal, the value $h_i(t)$ is updated to increase. The value $h_i(t)$ for each terminal increases until the conditional equation $$D_i(t) - h_i(t) > \frac{v_i^+(t)M_i(t)DB_i\psi(t)}{R_i(t)}$$

is not satisfied, and finally the value $D_i(t)-h_i(t)$ may be equal to or similar to $$\frac{v_i^+(t)M_i(t)DB_i\psi(t)}{R_i(t)}.$$

In this case, the scheduling metric metric$_i$ based on Equation 7 is the result of substituting $$\frac{v_i^+(t)M_i(t)DB_i\psi(t)}{R_i(t)}$$

instead of $D_i(t)-h_i(t)$, wherein the scheduling metric may be expressed as the following Equation 8.

$$\text{metric}_i = \frac{\mu_i(t)}{M_i(t)}\psi(t) \quad \text{Equation 8}$$

Herein, metric$_i$ denotes the scheduling metric for the terminal$_i$, $\mu_i(t)$ denotes the current data rate of the terminal$_i$, and M$_i$(t) denotes the average achievable data rate of the terminal$_i$. Based on Equation 8, the scheduling metric metric$_i$ for two or more terminals of the overload state is determined based on only the throughput related parameters $\mu_i(t)$ and M$_i$(t), regardless of the delay related parameters $D_i(t)$ and DB$_i$. In other words, the scheduler 250 may schedule to satisfy the throughput fairness for the two or more terminals of the overload state which satisfy the conditional equation $$D_i(t) - h_i(t) > \frac{v_i^+(t)M_i(t)DB_i\psi(t)}{R_i(t)}$$

of the fourth QoS state variable updating unit 360.

Figure 4:
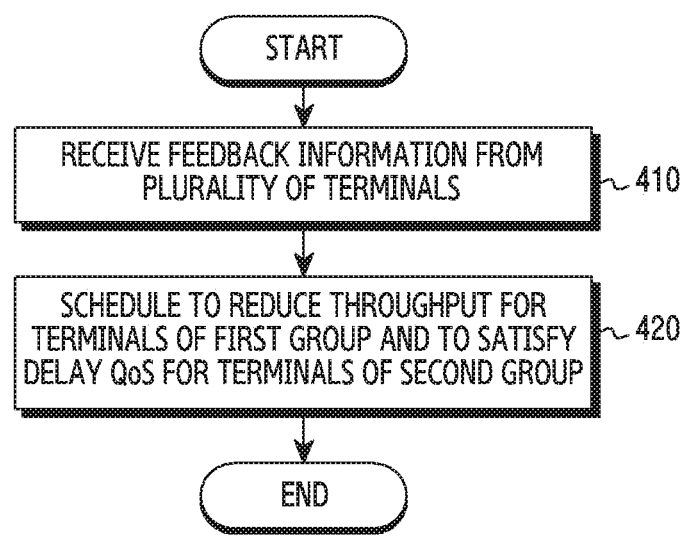
FIG. 4 is a flowchart of base station operations in a wireless communication system according to various embodiments of the present disclosure.

FIG. 4 is a flowchart of base station operations in a wireless communication system according to various embodiments of the present disclosure.

Referring to FIG. 4, in step 410, the base station receives feedback information from a plurality of terminals. The feedback information received from the plurality of terminals may include information relating to a channel state measured by each of the plurality of terminals. For example, the base station may determine a current achievable data rate for each of the plurality of terminals based on the channel state information.

In step 420, the base station schedules to reduce the throughput for first group of terminals and to satisfy the delay QoS for terminals of a second group. For the scheduling, the base station may use the feedback information received in step 410 and QCI information. For example, the QCI information may include at least one of the QoS parameter relating to the throughput fairness required for each of traffics, the QoS parameter relating to the maximum delay allowance, and the QoS parameter relating to the minimum data rate. Herein, the first group of terminals may be terminals which satisfy the conditional equation $$D_i(t) - h_i(t) > \frac{v_i^+(t)M_i(t)DB_i\psi(t)}{R_i(t)}$$

at the fourth QoS state variable updating unit 360, and second group of terminals may be terminals which do not satisfy the conditional equation $$D_i(t) - h_i(t) > \frac{v_i^+(t)M_i(t)DB_i\psi(t)}{R_i(t)}$$

at the fourth QoS state variable updating unit 360. In addition, the first group of terminals may be terminals in the overload state, and the second group of terminals may be terminals in the under-load state. The scheduler 250 may perform the scheduling to satisfy the throughput fairness between the first group of terminals.

Figure 5:
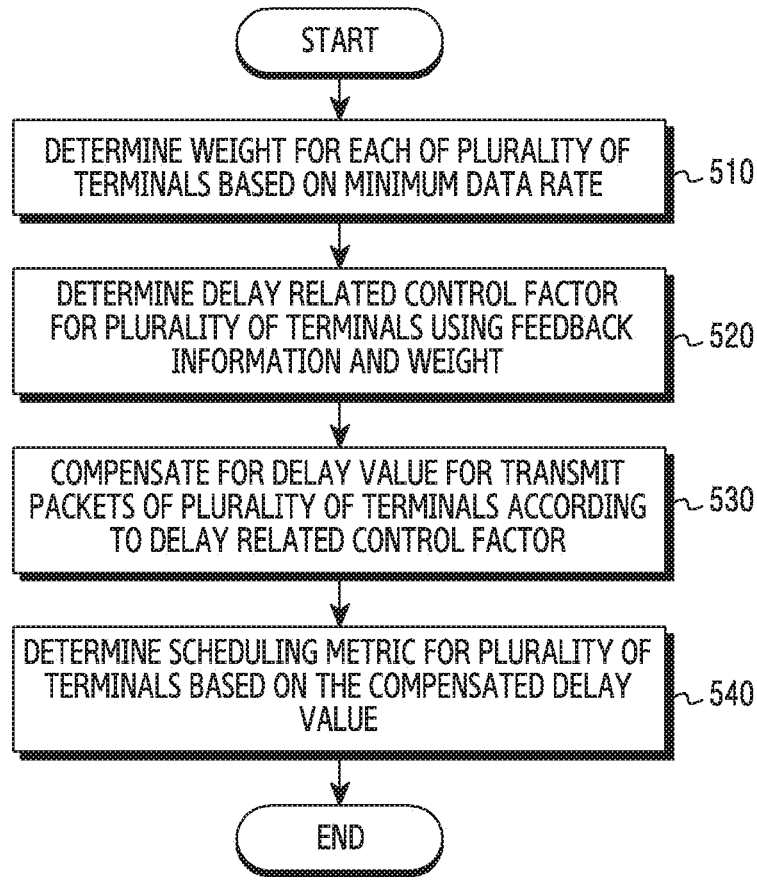
FIG. 5 is a detailed flowchart of base station operations for scheduling a plurality of terminals in a wireless communication system according to various embodiments of the present disclosure.

FIG. 5 is a detailed flowchart of base station operations for scheduling a plurality of terminals in a wireless communication system according to various embodiments of the present disclosure.

In step 510, the base station determines a weight for each of a plurality of terminals based on the minimum data rate. For doing so, the base station may use the QoS parameter relating to the minimum data rate in the QCI information. Specifically, with respect to a terminal of which the average throughput falls below the minimum data rate in Equation 5, the base station may increase the weight relating to the minimum data rate achievement for the corresponding terminal.

In step 520, the base station determines the delay related control factor for the plurality of terminals using feedback information and the weight. Specifically, the base station may determine whether the terminal is in the overload state by considering the weight determined based on Equation 6, and update the delay related control factor for the corresponding terminal with respect to the terminal of the overload state. In addition, for the terminal of the under-load state, the delay related control factor may maintain the same value as a previous value.

In step 530, the base station compensates for a delay value for transmit packets of the plurality of terminals according to the delay related control factor. For example, the base station may compensate for the delay value of the transmit packet by subtracting the delay related control factor $h_i(t)$ with respect to the delay value $D_i(t)$ of the transmit packet for a specific terminal as shown in Equation 7.

In step 540, the base station determines a scheduling metric for the plurality of terminals based on the compensated delay value. For example, the scheduler 250 may determine the scheduling metric for each terminal based on the current achievable data rate, the average achievable data rate, the maximum allowable delay, and the compensated delay value as shown in Equation 7. Although not depicted, the base station may determine the greatest value of the scheduling metric values for each terminal, and schedule the terminal corresponding to the determined scheduling metric.

Figure 6A:
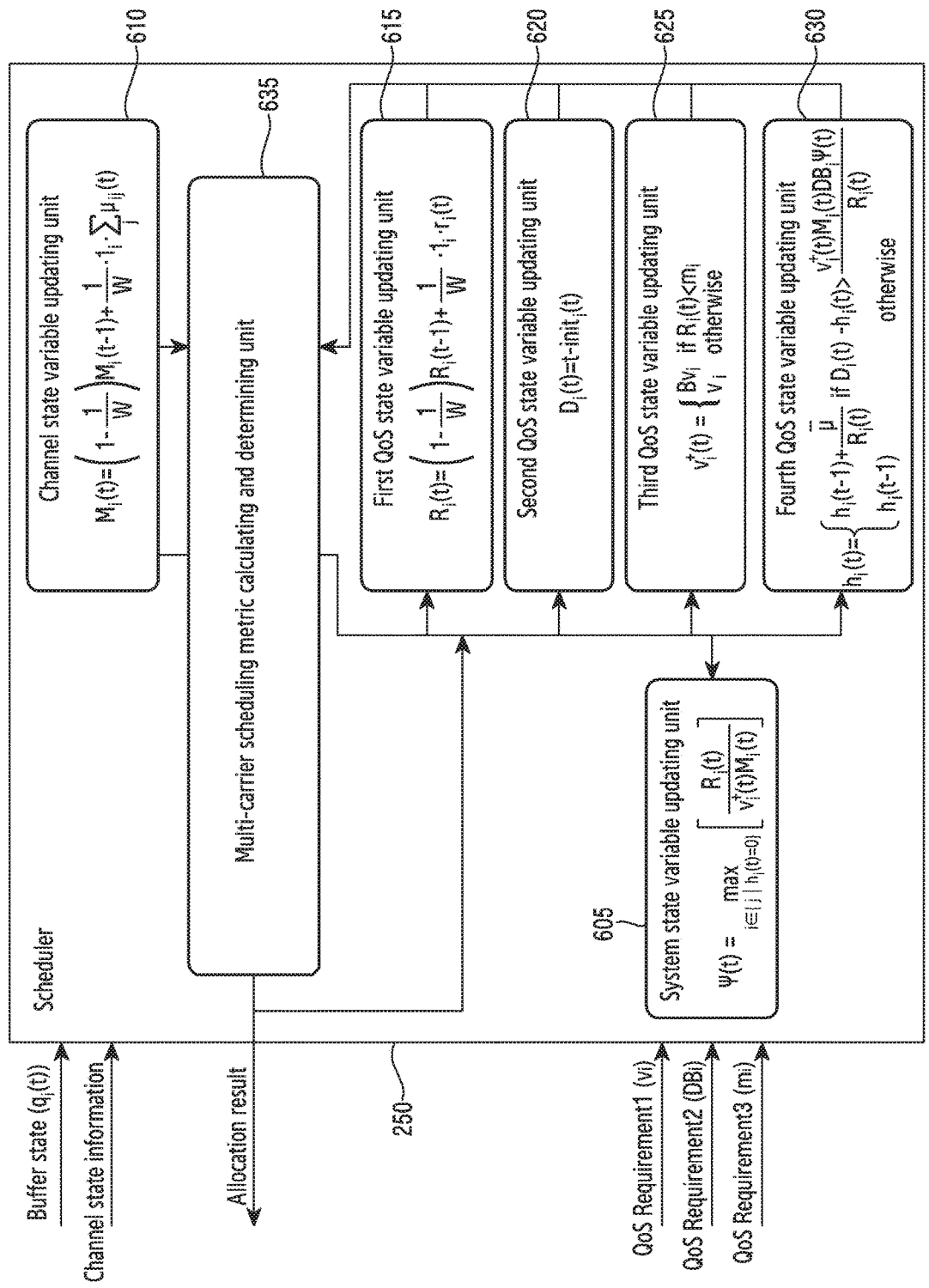
FIG. 6A illustrates a block configuration of a scheduler for scheduling a plurality of terminals by considering a multi-carrier in a wireless communication system according to various embodiments of the present disclosure.

FIG. 6A illustrates a block configuration of a scheduler for scheduling a plurality of terminals by considering a multi-carrier in a wireless communication system according to various embodiments of the present disclosure.

Referring to FIG. 6A, the scheduler 250 includes a system state variable updating unit 605, a channel state variable updating unit 610, a first QoS state variable updating unit 615, a second QoS state variable updating unit 620, a third QoS state variable updating unit 625, a fourth QoS state variable updating unit 630, and a multi-carrier scheduling metric calculating and determining unit 635. The function blocks included in the scheduler 250 are merely logical function blocks divided for the sake of explanations, and may not indicate physical hardware. In addition, the function blocks included in the scheduler 250 may be combined or omitted, and a calculation performed by the omitted function block may be conducted directly by the scheduler 250.

In FIG. 6A, calculations and operations performed by the system state variable updating unit 605, the first QoS state variable updating unit 615, the second QoS state variable updating unit 620, the third QoS state variable updating unit 625, and the fourth QoS state variable updating unit 630 are the same as the calculations and the operations performed by the system state variable updating unit 310, the first QoS state variable updating unit 330, the second QoS state variable updating unit 340, the third QoS state variable updating unit 350, and the fourth QoS state variable updating unit 360 respectively in FIG. 6A.

If a plurality of carriers is operated in the system, the scheduler 250 needs to schedule terminals for each carrier. In other words, the scheduler 250 performs the scheduling on a particular carrier of the multiple carriers, and performs the scheduling on other carrier by reflecting the buffer state updated according to the scheduling of the particular carrier. If scheduling the multiple carriers, the scheduler 250 needs to consider the channel state of the multiple carriers for each terminal.

Hence, the channel state variable updating unit 610 determines the average achievable data rate by considering the current achievable data rate of each terminal for the multiple carriers. For doing so, the channel state variable updating unit 610 may cumulatively average a past average achievable data rate, and the current achievable data rate in consideration of the multiple carriers. Specifically, the channel state variable updating unit 610 may determine the channel state variable $M_i(t)$ based on the following Equation 9.

$$M_i(t) = \left(1 - \frac{1}{w}\right)M_i(t-1) + \frac{1}{w} \cdot 1_i \cdot \sum_j \mu_{ij}(t) \qquad \text{Equation 9}$$

Herein, $M_i(t)$ denotes the average achievable data rate of the terminal$_i$, W denotes the window size, $1_i$ denotes the parameter indicating whether the terminal$_i$ is scheduled or not, and $\mu_i(t)$ is the current achievable data rate of the terminal$_i$. That is, unlike the single-carrier case, the scheduler 250 determines the current achievable data rate per carrier for each terminal for the scheduling of the multi-carrier, and determines the average achievable data rate for each terminal using a sum of the current achievable data rate values for each carrier.

After the channel state variable updating unit 610 determines the channel state variable $M_i(t)$, the scheduler 250 may schedule the multiple carriers using the determined channel state variable, and system state variable and QoS state variables determined at the system state variable updating unit 605, the first QoS state variable updating unit 615, the second QoS state variable updating unit 620, the third QoS state variable updating unit 625, and the fourth QoS state variable updating unit 630. The scheduling metric calculation and the determining for the scheduling are carried out at the multi-carrier scheduling metric calculating and determining unit 635, and the operations of the multi-carrier scheduling metric calculating and determining unit 635 are described in detail in FIG. 6B.

Figure 6B:
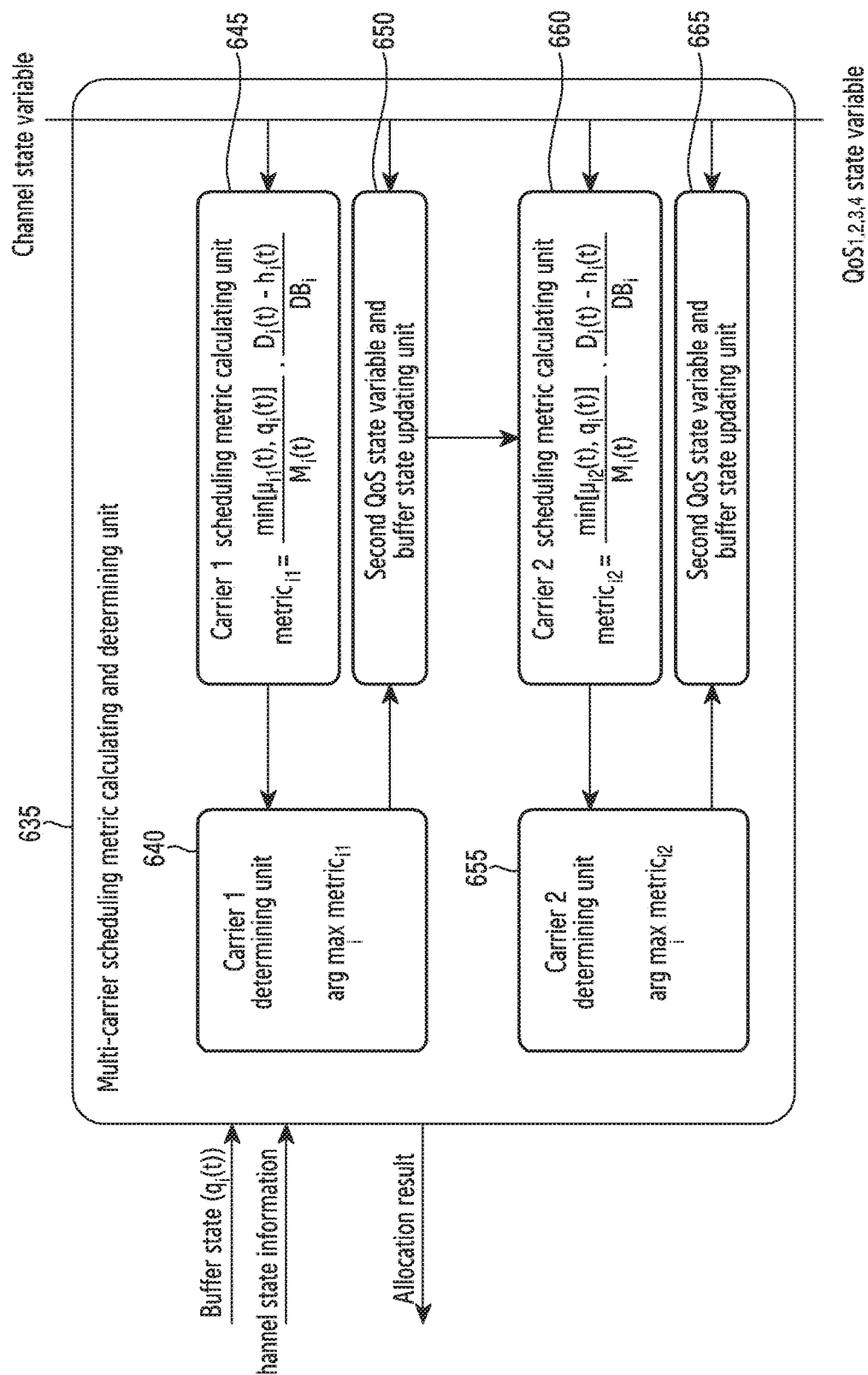
FIG. 6B illustrates a detailed configuration of a block for determining the scheduling by considering the multi-carrier at the scheduler in the wireless communication system according to various embodiments of the present disclosure.

FIG. 6B illustrates a detailed configuration of a block for determining the scheduling by considering the multi-carrier at the scheduler in the wireless communication system according to various embodiments of the present disclosure. Referring to FIG. 6B, the multi-carrier scheduling metric calculating and determining unit 635 includes a carrier 1 determining unit 640, a carrier 1 scheduling metric calculating unit 645, a second QoS state variable and buffer state updating unit 650, a carrier 2 determining unit 655, a carrier 2 scheduling metric calculating unit 660, and a second QoS state variable and buffer state updating unit 665.

The carrier 1 scheduling metric calculating unit 645 determines the scheduling metric of each terminal for the carrier 1. Specifically, the scheduling metric calculating unit 645 may determine a scheduling metric metric$_{i1}$ for the carrier 1 based on the following Equation 10.

$$\text{metric}_{i1} = \frac{\min[\mu_{i1}(t), q_i(t)]}{M_i(t)} \cdot \frac{D_i(t) - h_i(t)}{DB_i} \qquad \text{Equation 10}$$

Herein, $\mu_{i1}(t)$ denotes the current achievable data rate for the carrier$_1$ of the terminal$_i$, $q_i(t)$ denotes the buffer state for the terminal$_i$, $M_i(t)$ denotes the average achievable data rate of the terminal$_i$, $D_i(t)$ denotes the delay value of the transmit packet for the terminal$_i$, $DB_i$ denotes the delay upper bound allowed to the terminal$_i$, and $h_i(t)$ denotes the delay related control factor of the terminal$_i$. $\min[\mu_{i1}(t), q_i(t)]$ indicates the smaller value of $\mu_{i1}(t)$ and $q_i(t)$. $D_i(t)$, $DB_i$, and $h_i(t)$ may be calculated in the same manner as the single-carrier case. $M_i(t)$ was determined at the channel state variable updating unit 610 by considering the current data rate of the terminal$_i$ for every carrier. Hence, the scheduler 250 may determine the scheduling metric of each terminal for the carrier 1 based on the current achievable data rate for the carrier$_1$ of each terminal if the multi-carrier is operated, and the average achievable data rate of the terminal in consideration of the buffer state of each terminal and every carrier, as shown in Equation 10.

The carrier 1 determining unit 640 may determine the scheduling terminal using the scheduling metric values determined at the carrier 1 scheduling metric calculating unit 645. Specifically, the carrier 1 determining unit 640 may calculate the maximum value of the scheduling metric values, and determine a terminal corresponding to the maximum value as the terminal for the scheduling.

The second QoS state variable and buffer state updating unit 650 may update the buffer state by reflecting the scheduling result of the terminal for the carrier 1. That is, since the buffer of the base station 120 is updated according to the scheduling result for the carrier 1 and the head-of-line delay value of the transmit packet for each terminal is changed at the buffer, the second QoS state variable and buffer state updating unit 650 may update the second QoS state variable $D_i(t)$ and the buffer state value $q_i(t)$ for each terminal after the scheduling for the carrier 1. For the above-stated operation, the second QoS state variable and buffer state updating unit 650 may receive feedback regarding the scheduling result for the carrier 1 from the carrier 1 determining unit 640.

The carrier 2 scheduling metric calculating unit 660 may determine a scheduling metric metric$_{i2}$ of each terminal for the carrier 2. The carrier 2 scheduling metric calculating unit 660 may determine the scheduling metric metric$_{i2}$ for the carrier 2 by conducting a similar operation to the operation performed at the carrier 1 scheduling metric calculating unit 645. However, unlike the carrier 1 scheduling metric calculating unit 645, the carrier 2 scheduling metric calculating unit 660 may determine the scheduling metric metric$_{i2}$ of each terminal in the carrier 2 based on the current achievable data rate $\mu_{i2}(t)$ for the carrier 2 of each terminal and the updated buffer state.

The carrier 2 determining unit 655 may determine the scheduling terminal using the scheduling metric values determined at the carrier 2 scheduling metric calculating unit 660. Specifically, the carrier 2 determining unit 655 may determine the terminal of the greatest scheduling metric value as the terminal for the scheduling.

In FIG. 6B, while the multi-carrier scheduling metric calculating and determining unit 635 performs the scheduling only on the carrier 1 and the carrier 2 respectively, which is for the sake of explanations, the scheduler 250 may perform the scheduling on three or more carriers. For example, after the scheduling of the terminal for the carrier 2, the second QoS state variable and buffer state updating unit 665 may update the buffer state by reflecting the scheduling result for the carrier 2, and the scheduler 250 may perform the scheduling of the terminal for at least one other carrier based on the updated buffer state.

Figure 7:
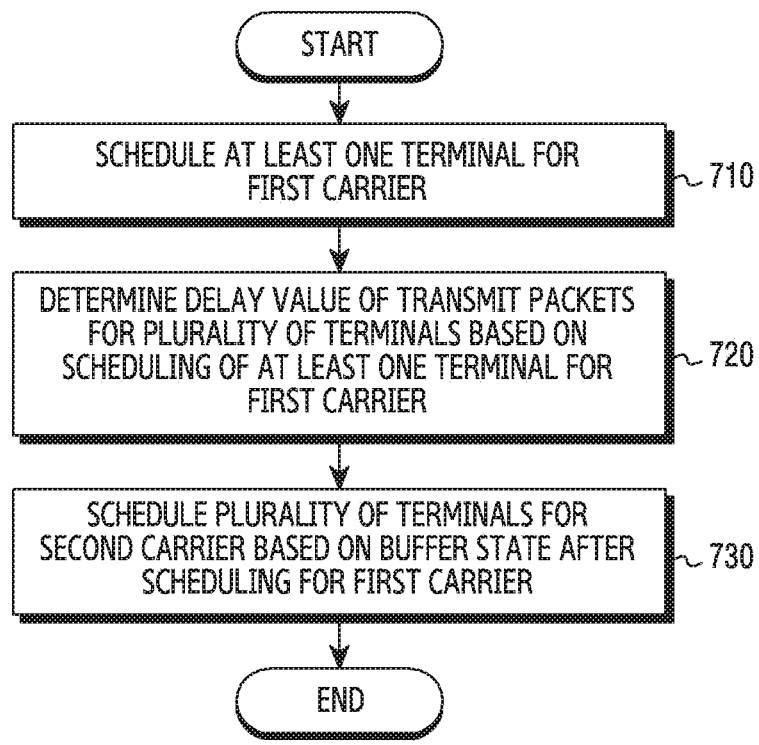
FIG. 7 is a flowchart of base station operations for scheduling a plurality of terminals by considering a multi-carrier in a wireless communication system according to various embodiments of the present disclosure.

FIG. 7 is a flowchart of base station operations for scheduling a plurality of terminals by considering a multi-carrier in a wireless communication system according to various embodiments of the present disclosure.

In step 710, the base station schedules at least one terminal for a first carrier. The base station may calculate scheduling metrics for a plurality of terminals for the first carrier, and schedule at least one terminal corresponding to a maximum value of the calculated scheduling metrics.

In step 720, the base station determines a delay value of transmit packets for each of the plurality of terminals based on the scheduling of at least one terminal for the first carrier. In other words, since the buffer of the base station is updated according to the scheduling result for the first carrier and the head-of-line delay value of the transmit packet for each terminal is changed in the buffer, the base station may determine the delay value of the transmit packet for each terminal after scheduling for the first carrier.

In step 730, the base station schedules the plurality of terminals for the second carrier based on the buffer state after scheduling for the first carrier. The base station may calculate the scheduling metrics for each terminal in the carrier 2 based on the updated buffer state, and schedule the terminal corresponding to the maximum scheduling metric of the calculated scheduling metrics.

Figure 8A:
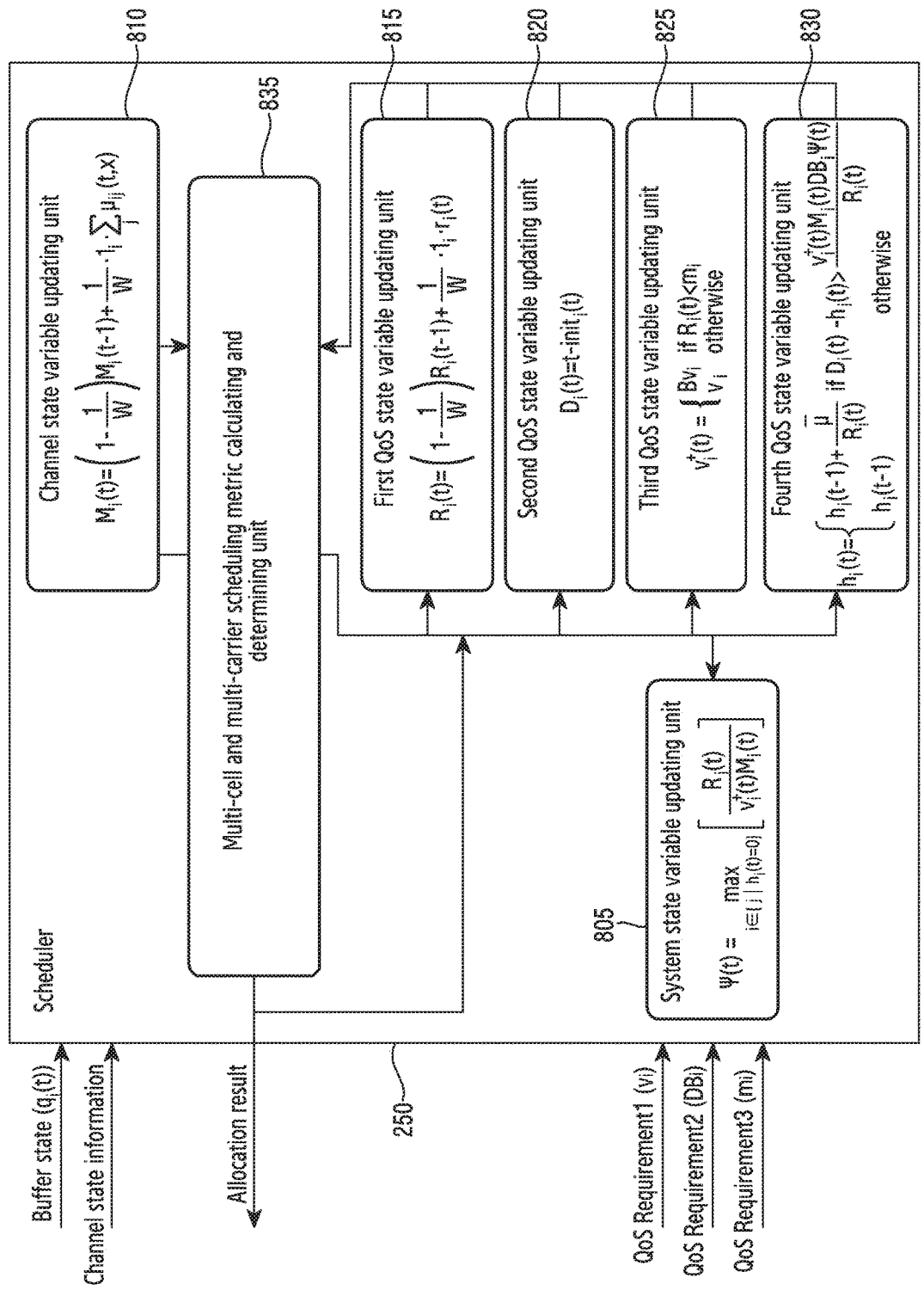
FIG. 8A illustrates a block configuration of a scheduler for scheduling a plurality of terminals by considering a multi-cell and a multi-carrier in a wireless communication system according to various embodiments of the present disclosure.

FIG. 8A illustrates a block configuration of a scheduler for scheduling a plurality of terminals by considering a multi-cell and a multi-carrier in a wireless communication system according to various embodiments of the present disclosure.

Referring to FIG. 8A, the scheduler 250 includes a system state variable updating unit 805, a channel state variable updating unit 810, a first QoS state variable updating unit 815, a second QoS state variable updating unit 820, a third QoS state variable updating unit 825, a fourth QoS state variable updating unit 830, and a multi-cell and multi-carrier scheduling metric calculating and determining unit 835. The function blocks included in the scheduler 250 are merely logical function blocks divided for the sake of explanations, and may not indicate physical hardware. In addition, the function blocks included in the scheduler 250 may be combined or omitted, and a calculation performed by the omitted function block may be conducted directly by the scheduler 250.

In FIG. 8A, calculations and operations performed by the system state variable updating unit 805, the first QoS state variable updating unit 815, the second QoS state variable updating unit 820, the third QoS state variable updating unit 825, and the fourth QoS state variable updating unit 830 are the same as the calculations and the operations performed by the system state variable updating unit 310, the first QoS state variable updating unit 330, the second QoS state variable updating unit 340, the third QoS state variable updating unit 350, and the fourth QoS state variable updating unit 360 in FIG. 3.

If a plurality of carriers and a plurality of base stations are operated in the system, the scheduler 250 needs to schedule terminals by considering the cooperative transmission scheme of the plurality of the base stations for each carrier. In other words, the scheduler 250 performs the scheduling on a particular carrier of the multiple carriers by considering the cooperative transmission scheme of the plurality of the base stations, and performs the scheduling on other carrier by reflecting the buffer state updated according to the scheduling of the particular carrier. If scheduling the multiple carriers by considering the cooperation type of the base station, the scheduler 250 needs to consider the channel state for the multiple carriers for each terminal and the cooperative transmission type of the base stations. The cooperation type of the base station may be expressed as a parameter x. For example, if two base stations A and B perform the cooperative transmission, the cooperative transmission type of the base station may be divided into i) a case where only the base station A transmits, ii) a case where only the base station B transmits, and iii) a case where both of the base stations A and B transmit, and the parameter x may be a unique scalar value or vector value corresponding to each cooperative transmission type.

If the scheduler 250 schedules the multiple carriers by considering the cooperation type, the channel state variable updating unit 810 determines the average achievable data rate by considering the current achievable data rate of each terminal for the multiple carriers and the cooperation type of the base station. For doing so, the channel state variable updating unit 810 may cumulatively average a past average achievable data rate, and the current achievable data rate in consideration of the multiple carriers and the cooperation type. Specifically, the channel state variable updating unit 810 may determine the channel state variable $M_i(t)$ based on the following Equation 11.

$$M_i(t) = \left(1 - \frac{1}{w}\right) M_i(t-1) + \frac{1}{w} \cdot 1_i \cdot \sum_j \mu_{ij}(t, x) \qquad \text{Equation 11}$$

Herein, $M_i(t)$ denotes the average achievable data rate of the terminal$_i$, W denotes the window size, $1_i$ denotes the parameter indicating whether the terminal$_i$ is scheduled or not, and $\mu_{ij}(t,x)$ is the current achievable data rate of the terminal$_i$ if the cooperative transmission type is x. That is, the scheduler 250 determines the current achievable data rate by considering the cooperation type of the base station per carrier for each terminal, and thus determines the average achievable data rate for each terminal using a sum of the current achievable data rate values for each carrier.

After the channel state variable updating unit 810 determines the channel state variable $M_i(t)$, the scheduler 250 may schedule the multiple carriers using the determined channel state variable and other state variables. The scheduling metric calculation and the determining for the scheduling are carried out at the multi-cell and multi-carrier scheduling metric calculating and determining unit 835, and the operations of the multi-carrier scheduling metric calculating and determining unit 835 are described in detail in FIG. 8B.

Figure 8B:
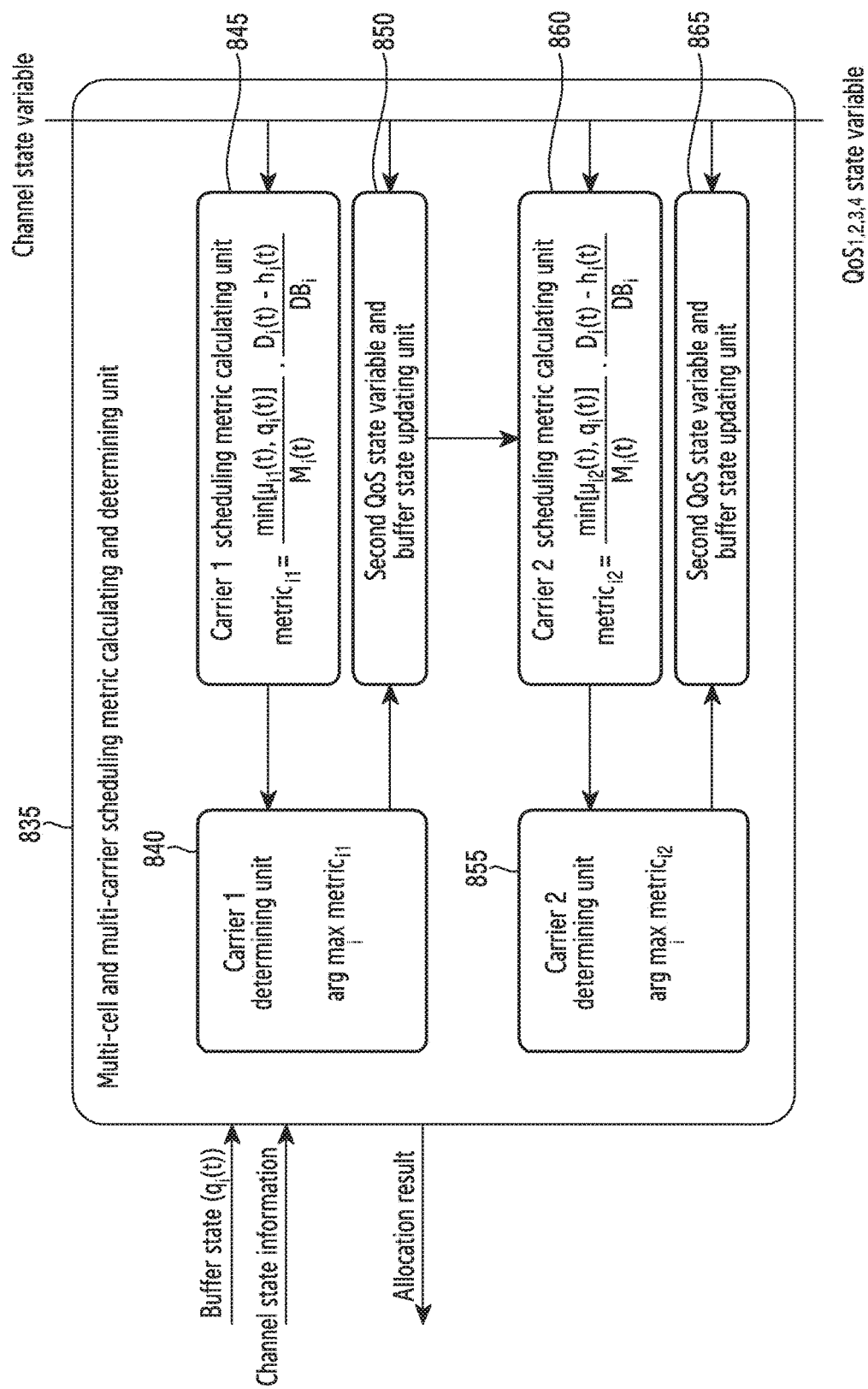
FIG. 8B illustrates a detailed configuration of a block for determining the scheduling by considering the multi-carrier and the multi-cell at the scheduler in the wireless communication system according to various embodiments of the present disclosure.

FIG. 8B illustrates a detailed configuration of a block for determining the scheduling by considering the multi-carrier and the multi-cell at the scheduler in the wireless communication system according to various embodiments of the present disclosure.

Referring to FIG. 8B, the multi-cell and multi-carrier scheduling metric calculating and determining unit 835 includes a carrier 1 determining unit 840, a carrier 1 scheduling metric calculating unit 845, a second QoS state variable and buffer state updating unit 850, a carrier 2 determining unit 855, a carrier 2 scheduling metric calculating unit 860, and a second QoS state variable and buffer state updating unit 865.

The carrier 1 scheduling metric calculating unit 845 determines the scheduling metric of each terminal for the carrier 1 by considering the cooperative transmission type of the base station. Specifically, if the cooperative transmission type of the base station is expressed as the parameter x, the carrier 1 scheduling metric calculating unit 845 may determine the scheduling metric metric$_{i1}$ for the carrier 1 based on the following Equation 12.

$$\text{metric}_{i1} = \frac{\min[\mu_{i1}(t, x), q_i(t)]}{M_i(t)} \cdot \frac{D_i(t) - h_i(t)}{DB_i} \qquad \text{Equation 12}$$

Herein, $\mu_{ij}(t,x)$ denotes the current achievable data rate of the terminal$_i$ if the cooperative transmission type is x, $q_i(t)$ denotes the buffer state for the terminal$_i$, $M_i(t)$ denotes the average achievable data rate of the terminal$_i$, $D_i(t)$ denotes the delay value of the transmit packet for terminal$_i$, $DB_i$ denotes the delay upper bound allowed to the terminal$_i$, and $h_i(t)$ denotes the delay related control factor of the terminal$_i$. $\min[\mu_{i1}(t,x),q_i(t)]$ indicates the smaller value of $\mu_{i1}(t,x)$ and $q_i(t)$. $D_i(t)$, $DB_i$, and $h_i(t)$ may be calculated in the same manner as the single-carrier case. $M_i(t)$ was determined at the channel state variable updating unit 810 by considering the current data rate of the terminal$_i$ for every carrier and the cooperative transmission type. Hence, the scheduler 250 may determine the scheduling metric of each terminal for the carrier 1 based on the current achievable data rate for the carrier$_i$ of each terminal in a specific cooperative transmission type if the multi-carrier is operated, and the average achievable data rate of the terminal in consideration of the buffer state of each terminal and every carrier, as shown in Equation 12. Next, the carrier 1 determining unit 840, the second QoS state variable and buffer state updating unit 850, the carrier 2 scheduling metric calculating unit 860, the carrier 2 determining unit 855, and the second QoS state variable and buffer state updating unit 865 may perform the scheduling on each carrier by executing a similar algorithm to the algorithm conducted by the carrier 1 determining unit 640, the second QoS state variable and buffer state updating unit 650, the carrier 2 scheduling metric calculating unit 660, the carrier 2 determining unit 655, and the second QoS state variable and buffer state updating unit 665 as described in FIG. 6B.

Figure 9:
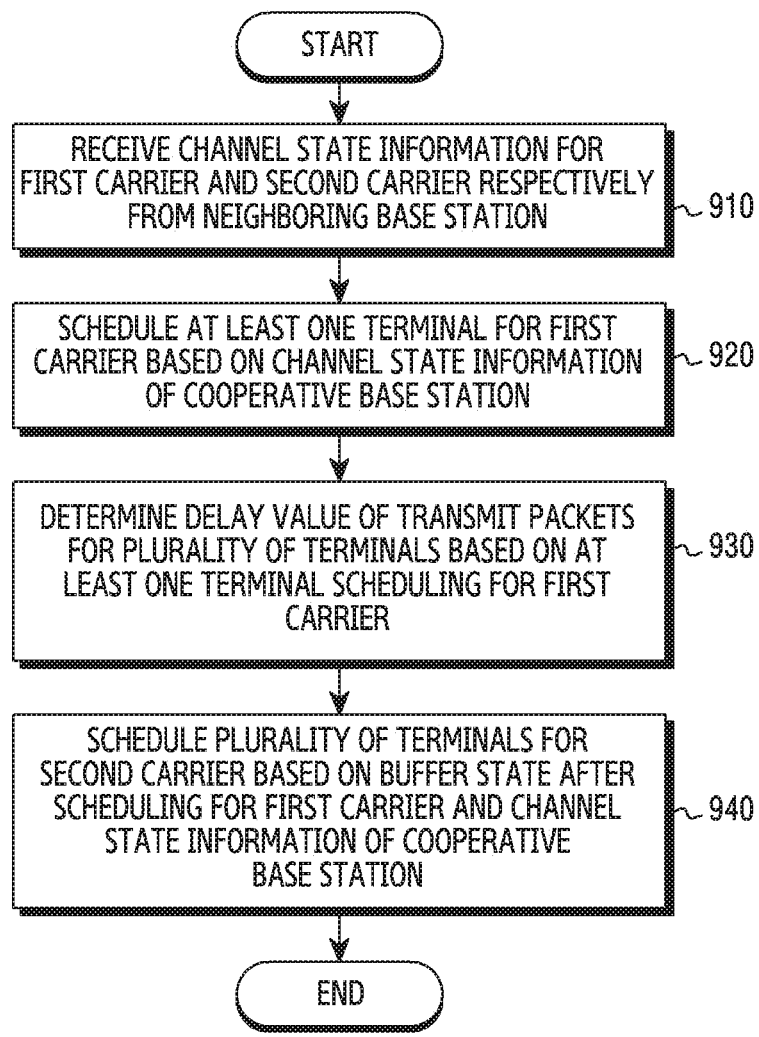
FIG. 9 is a flowchart of base station operations for scheduling a plurality of terminals by considering a multi-cell and a multi-carrier in a wireless communication system according to various embodiments of the present disclosure.

FIG. 9 is a flowchart of base station operations for scheduling a plurality of terminals by considering a multi-cell a multi-carrier in a wireless communication system according to various embodiments of the present disclosure.

In step 910, the base station receives channel state information for a first carrier and a second carrier respectively from a neighboring base station. For example, at least one neighboring base station may receive the channel state information for the first carrier and the second carrier respectively from a plurality of terminals, and at least one neighboring base station may forward the received channel state information to the base station.

In step 920, the base station schedules at least one terminal for the first carrier based on the channel state information of a cooperative base station. The base station may determine a cooperative transmission type of the base station and at least one neighboring base station using the channel state information received from at least one neighboring base station and channel station information received at the base station from the plurality of terminals. For example, the cooperation type information may include the number of the base stations which conduct the cooperative transmission with the plurality of terminals, and identifier information of the base station which conducts the cooperative transmission. The base station may determine the scheduling metric for each terminal by considering the cooperation type of the base station for the first carrier, and schedule the terminal of the maximum scheduling metric for the first carrier.

In step 930, the base station determines a delay value of transmit packets for each of the plurality of terminals based on at least one terminal scheduling for the first carrier. In other words, since the buffer of the base station is updated according to the scheduling result for the first carrier and the head-of-line delay value of the transmit packet for each terminal is changed in the buffer, the base station may determine the delay value of the transmit packet for each terminal after scheduling for the first carrier.

In step 940, the base station schedules the plurality of terminals for the second carrier based on the buffer state after the scheduling for the first carrier and the channel state information of the cooperative base station. The base station may calculate the scheduling metrics for each terminal by considering the updated buffer state according to the scheduling for the first carrier, the delay value for each terminal, and the cooperation type of the base station, and schedule the terminal corresponding to the maximum scheduling metric among the calculated scheduling metrics.

The methods according to the embodiments described in the claims or the specification of the present disclosure may be implemented in hardware, software, or a combination of hardware and software.

For the software implementation, a computer-readable storage medium which stores one or more programs (software modules) may be provided. One or more programs stored in the computer-readable storage medium may be configured for execution by one or more processors of an electronic device. One or more programs may include instructions for enabling the electronic device to execute the methods according to the embodiments described in the claims or the specification of the present disclosure.

Such a program (software module, software) may be stored to a random access memory, a non-volatile memory including a flash memory, a read only memory (ROM), an electrically erasable ROM (EEPROM), a magnetic disc storage device, a compact disc (CD)-ROM, digital versatile discs (DVDs) or other optical storage devices, and a magnetic cassette. Alternatively, the programs may be stored to a memory combining part or all of them. Also, a plurality of memories may be included.

Also, the programs may be stored in an attachable storage device accessible via a communication network such as Internet, Intranet, local area network (LAN), wide LAN (WLAN), or storage area network (SAN), or a communication network by combining these networks. Such a storage device may access an apparatus which realizes an embodiment of the present disclosure through an external port. Also, a separate storage device on the communication network may access the apparatus which realizes an embodiment of the present disclosure.

In the specific embodiments of the present disclosure as described above, the elements included in the disclosure are expressed in a singular or plural form. However, the singular or plural expression is appropriately selected according to a proposed situation for the convenience of explanations, the present disclosure is not limited to a single element or a plurality of elements, the elements expressed in the plural form may be configured as a single element, and the elements expressed in the singular form may be configured as a plurality of elements.

Meanwhile, the detailed description of the present disclosure has been described with reference to certain embodiments thereof, but various modifications may be made without departing from the scope of this disclosure. Therefore, the scope of this disclosure should not be limited to the described embodiments but should be defined by the claims as below and their equivalents within the scope of the claims.

The invention claimed is:

1. A method of a base station in a wireless communication system, the method comprising:
receiving feedback information from a plurality of terminals; and
scheduling the plurality of terminals based on the feedback information,
wherein the scheduling of the plurality of terminals comprises:
scheduling a first group of terminals in an overload state and a second group of terminals in an under-load state among the plurality of terminals so that a throughput for the first group of terminals is reduced and a delay quality of service (QoS) for the second group of terminals is satisfied,
scheduling at least one terminal for a first carrier,
determining a delay value of transmit packets for each of the plurality of terminals based on the scheduling of the at least one terminal for the first carrier, and
scheduling the plurality of terminals for a second carrier, based on the delay value of the transmit packets for each of the plurality of terminals.

2. The method of claim 1, wherein the scheduling of the plurality of terminals comprises:
determining a weight for each of the plurality of terminals based on a minimum data rate for each of the plurality of terminals;
determining a delay related control factor for each of the plurality of terminals using the feedback information and the weight;
compensating for a delay value for transmit packets of the plurality of terminals based on the delay related control factor; and
determining scheduling metrics for the plurality of terminals respectively based on the compensated delay value.

3. The method of claim 2,
wherein a scheduling metric for each terminal among the scheduling metric is determined so that a scheduling priority for each terminal is increased as the delay related control factor increases, and
wherein the delay related control factor increases if-based on a determination that a difference between the delay value and the delay related control factor is greater than a threshold which is determined from the weight, the feedback information, and the delay QoS.

4. The method of claim 3, wherein an increase in the delay related control factor corresponds to a value which is inversely proportional to an average throughput.

5. The method of claim 3, wherein the difference between the delay value and the delay related control factor is greater than the threshold, for the first group of terminals.

6. The method of claim 3, wherein, for the first group of terminals, the difference between the delay value and the delay related control factor is smaller than or equal to the threshold.

7. The method of claim 1, wherein the scheduling of the first group of terminals comprises:
scheduling the first group of terminals so that a throughput fairness between the first group of terminals is achieved.

8. The method of claim 1, further comprising:
receiving from at least one neighboring base station, information regarding a channel state between the at least one neighboring base station and the plurality of terminals for each of the first carrier and the second carrier,
wherein scheduling the at least one terminal for the first carrier comprises:
scheduling the at least one terminal for the first carrier based on the information, and
wherein scheduling the plurality of terminals for the second carrier comprises:
scheduling the plurality of terminals for the second carrier based on the information.

9. An apparatus of a base station in a wireless communication system, the apparatus comprising:
a transceiver configured to receive feedback information from a plurality of terminals; and
at least one processor configured to schedule the plurality of terminals based on the feedback information,
wherein the at least one processor is further configured to:
schedule a first group of terminals in an overload state and a second group of terminals in an under-load state among the plurality of terminals so that a throughput for the first group of terminals is reduced and a delay quality of service (QoS) for the second group of terminals is satisfied,
schedule at least one terminal for a first carrier,
determine a delay value of transmit packets for each of the plurality of terminals based on the scheduling of the at least one terminal for the first carrier, and
schedule the plurality of terminals for a second carrier, based on the delay value of the transmit packets for each of the plurality of terminals.

10. The apparatus of claim 9, wherein the at least one processor is further configured to:
determine a weight for each of the plurality of terminals based on a minimum data rate for each of the plurality of terminals,
determine a delay related control factor for each of the plurality of terminals using the feedback information and the weight,
compensate for a delay value for transmit packets of the plurality of terminals based on the delay related control factor, and determine scheduling metrics for the plurality of terminals respectively based on the compensated delay value.

11. The apparatus of claim 10, wherein a scheduling metric for each terminal among the scheduling metric is determined so that a scheduling priority for each terminal is increased as the delay related control factor increases, and wherein the delay related control factor increases based on a determination that a difference between the delay value and the delay related control factor is greater than a threshold which is determined from the weight, the feedback information, and the delay QoS.

12. The apparatus of claim 11, wherein an increase in the delay related control factor corresponds to a value which is inversely proportional to an average throughput.

13. The apparatus of claim 11, wherein the difference between the delay value and the delay related control factor is greater than the threshold, for the first group of terminals.

14. The apparatus of claim 11, wherein, for the first group of terminals, the difference between the delay value and the delay related control factor is smaller than or equal to the threshold.

15. The apparatus of claim 9, wherein the at least one processor is further configured to schedule the first group of terminals so that a throughput fairness between the first group of terminals is achieved.

16. The apparatus of claim 9, wherein the transceiver is further configured to receive, from at least one neighboring base station, information regarding a channel state between the at least one neighboring base station and the plurality of terminals for each of the first carrier and the second carrier, and wherein the at least one processor is further configured to:
schedule the at least one terminal for the first carrier based on the information, and
determine a scheduling of the plurality of terminals for the second carrier based on the information.

\* \* \* \* \*